G. W. WHEELER, 2d.
Truck.
No. 97,009.                          Patented Nov. 16, 1869.
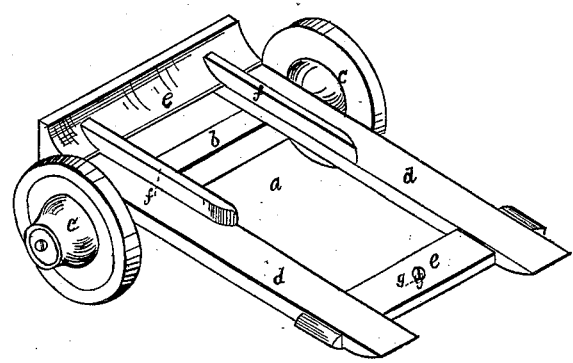
Witnesses
Geo. A. Loring
Edward Griffith
Inventor
G W Wheeler 2nd
by his Attorney
Frederick Curtis

United States Patent Office.

GEORGE W. WHEELER, 2D, OF NEW IPSWICH, NEW HAMPSHIRE.

Letters Patent No. 97,009, dated November 16, 1869.

IMPROVED VEHICLE FOR TRANSPORTING MACHINES.

The Schedule referred to in these Letters Patent and making part of the same

To all to whom these presents shall come:

Be it known that I, GEORGE W. WHEELER, 2d, of New Ipswich, in the county of Hillsborough, and State of New Hampshire, have made an invention of a new and useful Vehicle for Transporting Mowing-Machines, and other heavy articles; and do hereby declare the following to be a full, clear, and exact description thereof, due reference being had to the accompanying drawing, making part of this specification, and in which—

Figure 1 is a perspective representation of my invention.

The inconvenience resulting from drawing a mowing-machine over fields, owing to its bulky and complicated nature, is understood and appreciated by farmers and owners of such machines, and a carriage has long been needed, upon which to transport such machines, to protect them against injury from dust and gravel, and from unnecessary wear.

I have, in my invention, produced a vehicle, which, though extremely simple and economical, yet will economize many times its cost yearly, in preventing wear and injury to a mowing-machine.

The invention consists of a stout frame, $a$, composed of two side-rails, $d$ $d$, and two or more cross-bars, $e$ $e'$, mounted at its rear end upon an axle, $b$, and two wheels, $c$ $c$, the extent of the rearward projection of this frame beyond the axle being such, that upon running the wheels of a mowing-machine upon it, it shall be about equipoised, or with the excess of weight beyond the axle, in order to raise its forward end without exertion on the part of the laborer.

The forward ends of the side-rails $d$ $d$ are scarfed upon their upper or under sides, in order that the mowing-machine or other object shall easily mount them without impediment, while to the upper face of the inner edge of each rail, I erect a ledge or guard, $f$, to insure the proper position of the wheels of the mowing-machine, and to accommodate the carriage to transport machines of different sizes and manufactures.

The cross-bar $e$ is to be provided with a bolt, $g$, for attachment to a convenient part of the mowing-machine or other object which may be upon the carriage, in order to insure the proper position of the former upon the latter, and to cause the latter to travel in a right line with such machine.

When it becomes desirable to transport a mowing-machine for a distance, when out of work, whether this transportation be over an ordinary road or a field, the carriage above described is brought to it, and the forward part of such carriage placed upon the ground.

The mowing-machine is then placed upon its side-rails until the wheels of such mowing-machine stand over or pass slightly by the centre of the axle, when the forward ends of such side-rails will either be thrown upward against the under side of the mowing-machine, by its own gravity, or are to be brought up thereto by the attendant, the bolt being subsequently secured to any suitable part of such mowing-machine.

It will be apparent that a mowing-machine, thus accoutred, may be transported without wear or injury from any source.

The carriage, thus made, may be used to advantage in transporting heavy articles other than mowing-machines, though it was originated for this purpose.

What I claim as my invention, and desire to secure by Letters Patent, is—

A carriage for transporting mowing-machines, composed of the frame $a$, constructed and arranged upon an axle and wheels, substantially as shown and set forth.

GEORGE W. WHEELER, 2D.

Witnesses:
GEO. O. ROBBINS,
LUCIUS C. OLIVER.